United States Patent [19]
Saleck et al.

[11] 3,877,944
[45] Apr. 15, 1975

[54] PHOTOGRAPHIC SILVER SALT EMULSIONS COMPRISING POLYMERS WITH DISULFONIMIDE GROUPS

[75] Inventors: Wilhelm Saleck, Schildgen; Gerhard Balle, Cologne; Wolfgang Himmelmann, Opladen, all of Germany

[73] Assignee: Agfa-Gevaert Aktiengesellschaft, Bayerwerk, Germany

[22] Filed: Mar. 15, 1974

[21] Appl. No.: 451,543

Related U.S. Application Data

[62] Division of Ser. No. 308,565, Nov. 21, 1972, Pat. No. 3,827,890.

[30] Foreign Application Priority Data
Nov. 24, 1971 Germany............................ 2158196

[52] U.S. Cl...................................... 96/67; 96/114
[51] Int. Cl.............................................. G03c 1/04
[58] Field of Search................................ 96/114, 67

[56] References Cited
UNITED STATES PATENTS

| | | | |
|---|---|---|---|
| 3,137,576 | 6/1964 | Himmelmann et al. | 96/114 |
| 3,168,403 | 2/1965 | Himmelmann et al. | 96/114 |
| 3,371,060 | 2/1968 | Taylor et al. | 96/114 |
| 3,482,980 | 12/1969 | Hayawa et al. | 96/114 |
| 3,637,391 | 1/1972 | Saleck et al. | 96/114 |

Primary Examiner—Ronald H. Smith
Attorney, Agent, or Firm—Connolly and Hutz

[57] ABSTRACT

Photographic silver salt gelatin emulsions are made by precipitating the silver salt in the presence of gelatin, flocculation and washing the flocculate, with an aqueous solution of a polymer containing disulfonimide groups.

5 Claims, No Drawings

PHOTOGRAPHIC SILVER SALT EMULSIONS COMPRISING POLYMERS WITH DISULFONIMIDE GROUPS

This application is a division of copending U.S. application Ser. No. 308,565 filed Nov. 21, 1972 by Wilhelm Saleck, et al., for "Process for the Preparation of Photographic Silver Salt Emulsions", now U.S. Pat. No. 3,827,890.

This invention relates to a process for the preparation of photographic silver salt emulsions.

Photographic silver salt emulsions which contain gelatin and, in particular, silver halide emulsions, are generally prepared as follows:

After precipitation of the silver halide in a gelatin solution the emulsion is solidified by cooling and the gel is shredded and freed from soluble salts by washing with cold water. This washing process requires a certain amount of time owing to the finite rate of diffusion of the salts. During this washing, the gel increases in volume to a greater or lesser extent, depending on the type of gelatin used and this increase in volume is frequently accompanied by an undesirable decrease in viscosity. This decrease in viscosity must often be compensated for by the addition of gelatin during a subsequent melting stage (ripening or casting). In this process, it is difficult to vary the ratio of silver halide to gelatin as desired.

It is also known that the emulsions can be coagulated after precipitation by the addition of a precipitating agent and then separated from the supernatant aqueous solution which contains the dissolved salts. The coagulate is then washed with water and redispersed after the addition of a further quantity of gelatin solution; often the pH is adjusted to assist the redispersing. In this way it is possible to dispense with the time-consuming process of washing to remove the water-soluble salts. In addition, it is possible with this method to vary the character of the emulsions and to achieve improvements in their photographic properties.

The oldest method of flocculating silver halide gelatin emulsions is that of salt flocculation. An excess of a salt, such as sodium sulfate, is added to the emulsions so that the gelatin separates by flocculation together with the silver halide. The disadvantage of this method lies in the large excess of salt required to achieve complete flocculation. Moreover, the precipitates obtained cannot be washed with water because they readily redissolve. After flocculation, the emulsions have a certain conductivity which is caused by a high residual salt content. The emulsions may also be flocculated by adding organic liquide which are miscible with water and in which gelatin is insoluble. The disadvantage of this method lies in the large amount of organic solvents used and in the fact that various salts which are insoluble in the solvent mixture are precipitated at the same time. The coagulates obtained cannot be washed with water and it therefore becomes necessary to use a solvent mixture. The fire risk and the high solvent costs are quite out of proportion to the technical advantage obtained.

Another method of flocculating emulsions consists in chemical modification of the gelatin. Thus, for example gelatin, may be reacted with phthalic anhydride and the reaction product added to the gelatin used as protective colloid during precipitation. The gelatin derivatives can be precipitated from aqueous solution at pH 3 but the preparation of gelatin derivatives often leads to difficulties. It is necessary to maintain high pH values (above 10) during the reaction, which causes partial decomposition of the gelatin. Moreover, derivatives of this kind make it impossible to obtain very sensitive emulsions.

Other substances which have been described as flocculating agents are compounds which either form complexes with gelatin or which are themselves insoluble in water at certain pH values. When they precipitate, gelatin is carried down with them. Alkyl sulfonic acids which contain a large number of carbon atoms in the molecule ($C_{12} - C_{20}$) have been proposed for this purpose, for example. They react with gelatin to form adducts which are insoluble at pH 2 - 3. The disadvantage of this method lies in the large quantity of sulfonic acids required (20 - 30 %) and the consequent difficulties in casting and the relatively low pH at which precipitation takes place. It is known from practical experience in the preparation of photographic emulsions that if the pH is too acid (below 4) the sensitivity of a highly sensitive emulsion is reduced.

It is also known to use high-molecular weight compounds which are insoluble in acids as flocculating agents. These flocculating agents may be, e.g., polymeric compounds which contain carboxyl or sulfonic acid groups, such as polystyrene sulfonic acid and its derivatives. It is particularly with the last mentioned class of flocculating agents that acceptable flocculation of the silver halide emulsion can be achieved, but even this method has various disadvantages. Often, for example, the casting properties of the silver halide emulsion are deleteriously affected by the polymeric flocculating agent. These disadvantages can be obviated to a certain extent by keeping the concentration of the flocculating agents as low as possible, but then other difficulties arise when washing the flocculate. These difficulties consist in swelling of the silver halide gelatin emulsion which may go so far as to lead to peptization. Since flocculates which have undergone swelling or peptization settle relatively slowly, each individual washing stage requires long sedimentation times. It is therefore often necessary when employing such methods to use centrifuges in order to keep the sedimentation times as short as possible. In addition, these methods involve the risk of considerable losses of silver halide which bring the economy of the method into question. It has also been proposed to avoid swelling and peptization of the silver halide gelatin emulsion by adding substances which have properties similar to those of flocculating agents to the washing water, e.g., polystyrene sulfonic acid or long chain aliphatic sulfates such as dodecyl sulfate. Although, a certain improvement is thus achieved, the concentration of flocculating agent still needs to be kept relatively high and in addition it is often necessary to contrifuge. In any case, these variations of the process do not sufficiently meet practical requirements.

It is among the objects of the present invention to modify methods of flocculating silver salt emulsions in such a way that adequate sedimentation rates combined with the least possible loss of silver are achieved without adversely affecting the photographic properties of the silver salt emulsions.

We now have found a process for the preparation of photographic silver salt gelatin emulsions by precipitating the silver salt in the presence of gelatin, flocculating and washing the flocculate in which polymeric compounds containing disulfonimide groups attached to the polymer chain either directly or via bridge members are added to the water used for washing the flocculate.

Particularly suitable are water soluble homopolymers or copolymers of olefinically unsaturated disulfonimides of the following formula:

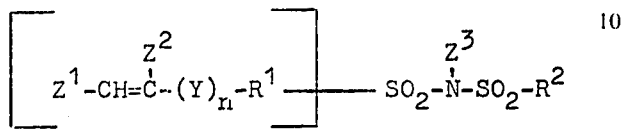

in which
R¹ is a divalent organic bridge member containing 2 – 18 carbon atoms, e.g., (1) a divalent aliphatic chain, preferably an alkylene chain, having preferably up to 5 carbon atoms, which chain may be interrupted by heteroatoms such as oxygen or nitrogen or by phenylene groups, (2) cycloalkylene such as cyclopentylene or cyclohexylene or (3) arylene bridges, preferably phenylene or naphthylene; the organic bridge member may contain further substituents such as alkyl, alkoxy, halogen such as chlorine or bromine, carboxyl, esterified carboxyl or nitrile;
R² is (1) a saturated or unsaturated aliphatic group with up to 18 carbon atoms, preferably an alkyl group with up to 5 carbon atoms, (2) cycloalkyl such as cyclopentyl or cyclohexyl, (3) aryl, in particular a phenyl group or (4) the group

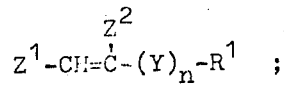

R² also may contain further substituents of the kind indicated for R¹;
Y is

Y is -N-CO-, -O-CO- or -CO-
      |                          |
      Z⁴ in which the carbonyl group is in all cases attached to the double bond;
$n$ is 0 or 1;
Z¹ is a hydrogen atom, an alkyl group with up to 4 carbon atoms or a carboxyl group;
Z², Z³, Z⁴ are hydrogen atoms or alkyl groups with up to 4 carbon atoms, Z¹ being a carboxyl group when Z¹ is an alkyl radical.

These disulfonimides are prepared by known processes of condensation of suitable sulfonic acid amides with sulfonic acid halides in an alkaline medium. Reference may be made to HOUBEN-WEYL, Methoden der organischen Chemie, volume IX, pages 636 and 637 and to German Pat. Nos. 757,262 and 1,249,259 and U.S. Pat. Nos. 2,374,934 and 3,052,656.

The following are examples of suitable monomers for preparing the polymers used according to the invention:

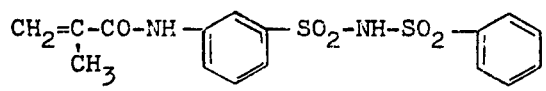   I

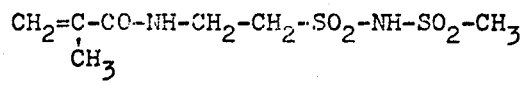   II

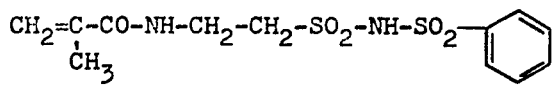   III

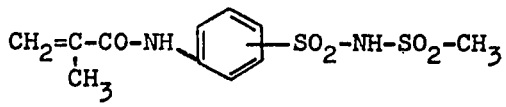   IV

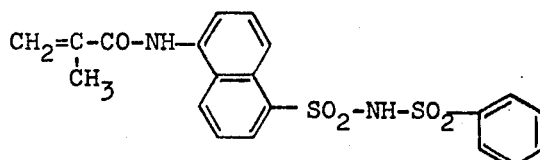   V

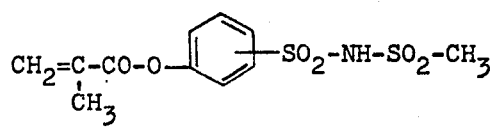   VI

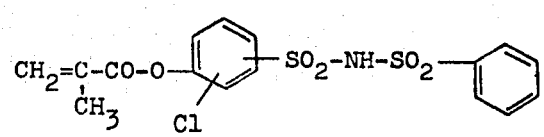   VII

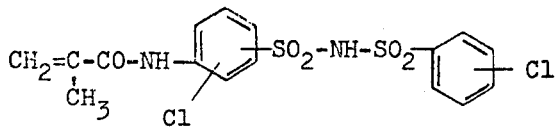             VIII as well as acrylic derivatives thereof, and

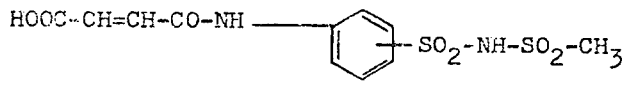             IX

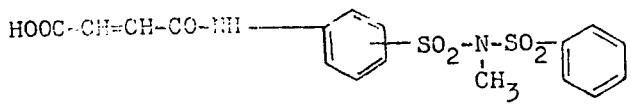             X

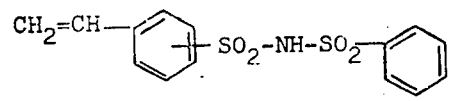             XI

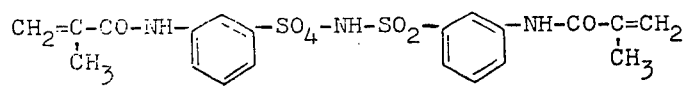             XII

The following are examples of suitable olefinically unsaturated comonomers:

a. $\alpha, \beta$-unsaturated carboxylic acids and dicarboxylic acids containing 3 – 5 carbon atoms, e.g., acrylic acid, methacrylic acid, crotonic acid, maleic acid, fumaric acid or itaconic acid as well as half esters and half amides of maleic, fumaric or itaconic acid;

b. amides of $\alpha, \beta$-unsaturated carboxylic acids containing 3 – 5 carbon atoms, e.g., acryl or methacrylamide;

$\alpha, \beta$-unsaturated nitriles containing 3 – 5 carbon atoms, e.g., acrylonitrile;

d. aliphatic vinyl compounds, for example vinyl ethers, such as vinylethyl ether, vinyl esters such as vinyl acetate or vinyl chloroacetate or vinyl ketones such as vinylethyl ketone;

e. esters of $\alpha, \beta$-unsaturated carboxylic acids with 3 – 5 carbon atoms and alcohols with 1 – 4 carbon atoms, e.g., methyl acrylate, ethyl acrylate, butyl acrylate or methyl methacrylate;

f. monoesters of $\alpha, \beta$-unsaturated carboxylic acids with 3 – 5 carbon atoms and polyhydric alcohols, e.g., 2-hydroxyethyl methacrylate, 2-hydroxypropyl methacrylate or 4-hydroxybutyl acrylate.

The nature and quantity of the comonomer or comonomers used must be chosen so that a water-soluble polymer is obtained. The proportion of the disulfonimide in the composition of the polymer should be at least 5 mols % but is preferably 20 – 100 mols %. Polymerization is advantageously carried out by dissolving the monomers in water with the addition of some alkali or sodium carbonate or bicarbonate to obtain a slightly acid or neutral solution. The solution is introduced into a suitable reaction vessel equipped with an efficient stirrer, addition funnel, thermometer and reflux condenser, the air is displaced from the apparatus by inert gas such as nitrogen and polymerization is started by the addition of an initiator.

The polymerization initiators used may be inorganic "per"-compounds such as potassium or ammonium peroxidisulfate, hydrogen peroxide, percarbonates or organic peroxides such as acyl peroxides, e.g., benzoyl or lauryl peroxide, alkyl peroxides, e.g., di-tert.-butyl hydroperoxide, alkyl hydroperoxides, e.g., tert.-butyl hydroperoxide, cumene hydroperoxide, or p-menthane hydroperoxide. The inorganic or organic "per" compounds are advantageously used in combinations with reducing agents by the known method of redox polymerization. Suitable reducing agents are, for example, alkali metal or ammonium bisulfites, sodium formaldehyde sulfoxylate, triethanolamine or tetraethylene pentamine.

The catalysts are used in quantities of 0.05 – 10 % of the monomers. The polymerization temperature employed depends on the activity of the catalyst and is preferably in the region of 0° – 80°C. The polymers have average molecular weights in the region of 5.000 to 500.000. The molecular weight can be influenced by the usual molecular weight regulating agents usually applied in polymer chemistry, provided they are photographically inert.

Polymer 1 poly-N-(m-methacrylamidobenzene sulfonyl)-benzene sulfonamide.

800 g of compound I and 2000 ml of boiled, salt-free water are stirred together and the compound is brought into solution by addition in portions of 240 g of sodium bicarbonate. The solution is introduced into a reaction vessel equipped with stirrer, gas inlet tube, dropping funnel and reflux condenser and heated to 40°C under a stream of nitrogen. A solution of 0.8 g of sodium metabisulfite in 100 ml of salt-free water is first run in through the dropping funnel and thereafter a solution of 2.4 g of potassium peroxidisulfate in 300 ml of salt-free water is introduced dropwise in the course of one hour.

Polymerization starts after a few minutes, the temperature then rising to 55° – 60°C and is practically completed after 12 – 15 hours. The solution has a solids content of 25 %.

The following copolymers are prepared in analogous manner in the form of 10 % aqueous solutions:

| Polymer 2: | copolymer of | 50 % methyl acrylate and 50 % compound I |
| --- | --- | --- |
| Polymer 3: | copolymer of | 40 % methyl acrylate and 60 % compound I |
| Polymer 4: | copolymer of | 30 % methyl acrylate and 70 % compound I |
| Polymer 5: | copolymer of | 30 % ethyl acrylate and 70 % compound I |
| Polymer 6: | copolymer of | 40 % ethyl acrylate 30 % acrylic acid and 30 % compound I |
| Polymer 7: | copolymer of | 80 % acrylic acid amide and 20 % compound I |
| Polymer 8: | copolymer of | 60 % acrylic acid amide and 40 % compound I |
| Polymer 9: | copolymer of | 40 % acrylic acid amide and 60 % compound I |
| Polymer 10: | copolymer of | 80 % acrylic acid and 20 % compound I |
| Polymer 11: | copolymer of | 60 % acrylic acid and 40 % compound I |
| Polymer 12: | copolymer of | 40 % acrylic acid and 60 % compound I |

The following polymers are prepared in analogous manner as aqueous solutions of 25 % solids content:

| Polymer 13: | Poly-N-(β-methacrylamidoethylsulfonyl)-methane sulfonamide |
| --- | --- |
| Polymer 14: | Poly-N-(β-methacrylamidoethylsulfonyl)-benzene sulfonamide |
| Polymer 15: | Poly-N-(m-methacrylamidobenzenesulfonyl)-methane sulfonamide |
| Polymer 16: | Poly-N-(5-acrylamidonaphthalene-1-sulfonyl)-benzene sulfonamide |
| Polymer 17: | Poly-N-(m-acryloyloxybenzenesulfonyl)-methane sulfonamide |
| Polymer 18: | Poly-N-(m-methacryloyloxy-p-chlorobenzene-sulfonyl)-benzene sulfonamide |
| Polymer 18: | Poly-N-(m-methacryloyloxy-p-chlorobenzene-sulfonyl)-p-chlorobenzene sulfonamide |
| Polymer 20: | Poly-N-(m-maleinoylamidobenzenesulfonyl)-methane sulfonamide |
| Polymer 21: | Poly-N-methyl-N-(m-maleinylamidobenzene-sulfonyl)-benzene sulfonamide |
| Polymer 22: | Poly-N-(benzenesulfonyl)-styrene-p-sulfonamide |
| Polymer 23: | copolymer of 40 % acrylic acid, 57 % compound I and 3 % compound XII. |

The process according to the invention is suitable for preparing any type of silver salt gelatin emulsion and particularly for preparing silver halide gelatin emulsions. The silver halides used for the emulsions may be, e.g., silver chloride or silver bromide, if desired with a small silver iodide content of up to 10 mols %. The process according to the invention may be used for preparing either fine-grained or coarse-grained emulsions with either a low or a high silver content. Preparation of the emulsions is carried out in known manner. Flocculation may be carried out with the usual flocculating agents, preferably with polymeric flocculating agents and especially those which contain sulfonic acid groups, e.g., polystyrene sulfonic acid as described in German Pat. No. 1,085,422, sulfonated styrene copolymers according to U.S. Pat. No. 3,168,403 or polyphenylene oxide sulfonic acids according to U.S. Pat. No. 3,137,576. If the flocculate is washed several times, it is often sufficient if the polymeric disulfonimides used according to the invention are only added to the first wash water.

The concentration of polymeric disulfonimides in the first wash water may vary within wide limits. Quantities of between 0.01 and 10 % by weight have been found to be sufficient, 0.05 to 1 % being preferred. Based on the quantity of gelatin, this corresponds to a concentration of 1 – 10 % by weight.

The advantages of the process according to the invention for washing flocculated silver salt emulsions are as follows:

1. Increased solidity of the flocculate even when washed several times;
2. reduced sedimentation time and therefore less time required for preparation. Centrifuging is generally not required;
3. reduction in silver losses in the washing process;
4. the washing effect is thereby substantially improved, especially in the case of fine-grained emulsions which because of the method by which they are prepared contain low salt concentrations.

The process according to the invention is particularly advantageous for the preparation of silver halide emulsions which are precipitated in the presence of silicic acid sol. These processes have been described in German Offenlegungsschrift No. 2,015,404 and in U.S. Pat. No. 3,637,391.

The polymeric disulfonimides used according to the invention also unexpectedly have the effect of improving the photographic properties of the emulsion. In the case of coarse-grained silver halide emulsions, more straight characteristic curves are observed. Higher sensitivities increased by 1 – 1,5°DIN are generally obtained. No such effects are observed when using the known flocculating agents such as polystyrene sulfonic acid or long chain aliphatic sulfates which are also added to the wash water.

EXAMPLE 1

A neutral silver iodobromide emulsion containing 6 % of silver iodide is precipitated to produce particles with an average grain size of 1.1 μm. 100 g of gelatin are used for precipitating 1 kg of silver halide. After precipitation and Ostwald ripening of the silver halide, the emulsion is cooled to 35°C. 10 ml of a 10 % polystyrene sulfonic acid are added and flocculation is carried out by acidifying to pH 3.0 with 25 % sulfuric acid. The flocculate is left to settle and the supernatant solution is removed. The flocculate is then washed twice with 20 litres of water in which it is agitated by stirring for 5 minutes. After the last removal of water, the flocculate is dissolved in an appropriate quantity of water and gelatin at pH 7 and 40°C, treated with sulfur compounds and gold salts as ripening additives and then ripened at a suitable ripening temperature after adjustment of the pAg value to 8.9 (emulsion A).

A second emulsion is prepared in the same manner but in addition 20 ml of 20 % solution of polymer I are added to the first wash water. The procedure is otherwise the same as described above (emulsion B).

Both emulsions are made ready for casting in the usual manner with 200 mg 4-hydroxy-6-methyl-1,3,3a,7-tetraazaindene as stabilizer, 600 mg saponin as wetting agent and 10 ml of a 10 % aqueous solution of formaldehyde as hardener and cast on a cellulose acetate support. After exposure behind a step wedge, the emulsions are developed for 7 minutes and 16 minutes at 20°C in a developer of the following composition:

| | |
|---|---|
| Sodium sulfite anhydrous | 70.0 g |
| borax | 7.0 g |
| hydroquinone | 3.5 g |
| p-monomethylaminophenol sulfate | 3.5 g |
| sodium citrate | 7.0 g |
| potassium bromide | 0.4 g |
| made up to 1 litre with water | | and assessed densitometrically. From the following table it will be seen that the additive increases the sensitivity and reduces the analytically determined silver losses in the wash water.

Table

| Experiment | 7 minutes development | | | 16 minutes development | | | AgNO₃ g/per litre of wash water | |
|---|---|---|---|---|---|---|---|---|
| | Sensitivity | γ | Fog | Sensitivity | γ | Fog | 1st wash water | 2nd wash water |
| A | | 0.60 | 0.07 | | 0.95 | 0.14 | 0.42 | 0.58 |
| B with 0.2 g in the 1st wash water | +1.0° | 0.65 | 0.10 | +1.2° | 1.05 | 0.15 | 0.10 | 0.15 |

3° = 1 shutter stop

EXAMPLE 2

Silver halide emulsions are prepared and processed as described in Example 1.
The following results are obtained:

Table

| Additive to the wash water | 7 minutes development | | | 16 minutes development | | | AgNO₃ g/per litre of wash water | |
|---|---|---|---|---|---|---|---|---|
| | Sensitivity | γ | Fog | Sensitivity | γ | Fog | 1st wash water | 2nd wash water |
| none | Standard | 0.75 | 0.11 | Standard | 0.95 | 0.18 | 0.40 | 0.60 |
| Polymer 2 | +0.5° | 0.65 | 0.09 | ±0° | 0.90 | 0.16 | 0.15 | 0.30 |
| Polymer 3 | +1° | 0.70 | 0.10 | +0.5° | 0.90 | 0.16 | 0.12 | 0.24 |
| Polymer 4 | +0.5° | 0.60 | 0.08 | +1° | 0.85 | 0.14 | 0.13 | 0.21 |
| Polymer 5 | +1.5° | 0.80 | 0.12 | +1° | 1.00 | 0.18 | 0.16 | 0.27 |
| Polymer 6 | +1° | 0.80 | 0.17 | +1° | 1.00 | 0.30 | 0.10 | 0.14 |
| Polymer 7 | +1° | 0.70 | 0.16 | +1° | 1.00 | 0.25 | 0.11 | 0.15 |
| Polymer 8 | +1° | 0.75 | 0.09 | +1° | 0.90 | 0.12 | 0.11 | 0.20 |
| Polymer 10 | +1° | 0.70 | 0.10 | +0.5° | 0.85 | 0.13 | 0.14 | 0.19 |
| Polymer 11 | +0.5° | 0.65 | 0.11 | +1° | 0.80 | 0.14 | 0.10 | 0.18 |
| Polymer 13 | +0.5° | 0.65 | 0.13 | +0.5° | 0.80 | 0.20 | 0.15 | 0.23 |
| Polymer 15 | +1° | 0.75 | 0.15 | +0.5° | 0.85 | 0.21 | 0.17 | 0.26 |
| Polymer 16 | +0.5° | 0.70 | 0.14 | +1° | 0.85 | 0.23 | 0.12 | 0.22 |
| Polymer 17 | +1° | 0.80 | 0.17 | +0.5° | 0.95 | 0.24 | 0.13 | 0.23 |
| Polymer 19 | +1° | 0.75 | 0.16 | +1° | 1.00 | 0.27 | 0.14 | 0.22 |
| Polymer 20 | +0.5° | 0.70 | 0.14 | +1° | 0.95 | 0.25 | 0.16 | 0.24 |
| Polymer 22 | +1° | 0.75 | 0.15 | +1° | 1.00 | 0.22 | 0.15 | 0.24 |
| Polymer 23 | +1° | 0.80 | 0.16 | +1° | 1.05 | 0.23 | 0.10 | 0.16 |

3° = 1 shutter stop

We claim:

1. A photographic material containing at least one supported silver salt gelatin emulsion layer, which contains a polymeric disulfonimide, the disulfonimide groups being attached to the polymer chain either directly or via bridge members.

2. The photographic material of claim 1, containing water-soluble polymers of olefinically unsaturated disulfonimides of the following formula $$\left[ Z^1-CH=\overset{Z^2}{\underset{|}{C}}-(Y)_n-R^1 \right] - SO_2-\overset{Z^3}{\underset{|}{N}}-SO_2-R^2$$

in which
R¹ is a divalent organic bridge member with 2 – 18 carbon atoms;

R² is (1) a saturated or unsaturated aliphatic radical with up to 18 carbon atoms, (2) cycloalkyl, (3) aryl or (4) the group $$Z^1-CH=\overset{Z^2}{\underset{|}{C}}-(Y)_n-R^1 \; ;$$

Y is

Y is $-N-CO-$, $-O-CO-$ or $-CO-$
          $\underset{Z^4}{|}$ in which the carbonyl group is attached to the olefinic double bond;

$n$ is 0 or 1;

Z¹ represents hydrogen, an alkyl group with up to 4 carbon atoms or carboxyl;

Z², Z³ and Z⁴ stand for hydrogen or alkyl groups with up to 4 carbon atoms, Z¹ being a carboxyl group when Z⁴ is an alkyl radical.

3. The photographic material of claim 1, wherein the polymeric disulfonimide is a polymer of acrylic acid or methacrylic acid, the disulfonimide group being attached to the carboxyl group of acrylic acid or methacrylic acid via an amide or ester bond.

4. The material of claim 2, wherein the polymeric disulfonimide is a homopolymer or copolymer of the following monomer:

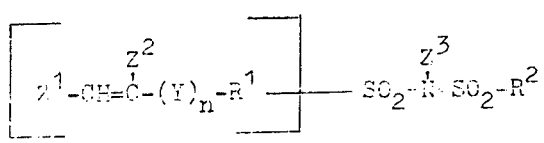

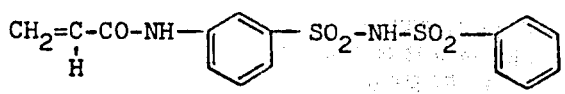
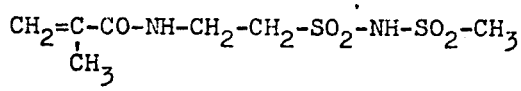
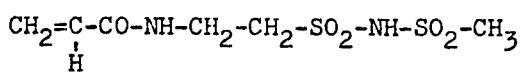
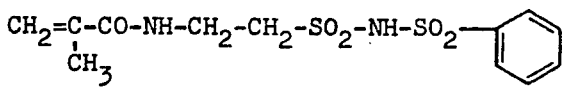
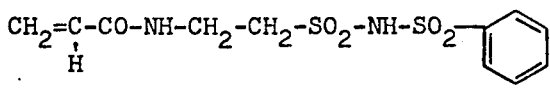
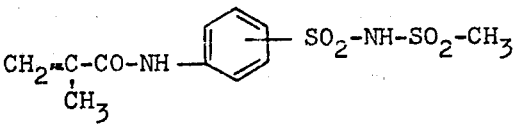
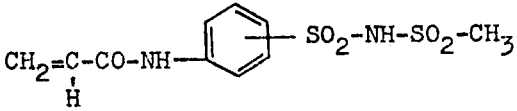
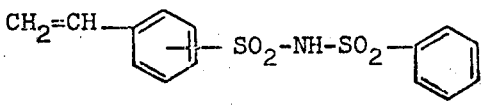
5. The material of claim 2, wherein the polymeric disulfonimide is a copolymer of acrylic acid, acrylic acid esters, acrylic acid amide or methacrylic acid.
* * * * *